Oct. 27, 1936.    R. L. HINMAN    2,058,587
MILK SEDIMENT TESTING APPARATUS
Filed Sept. 4, 1934
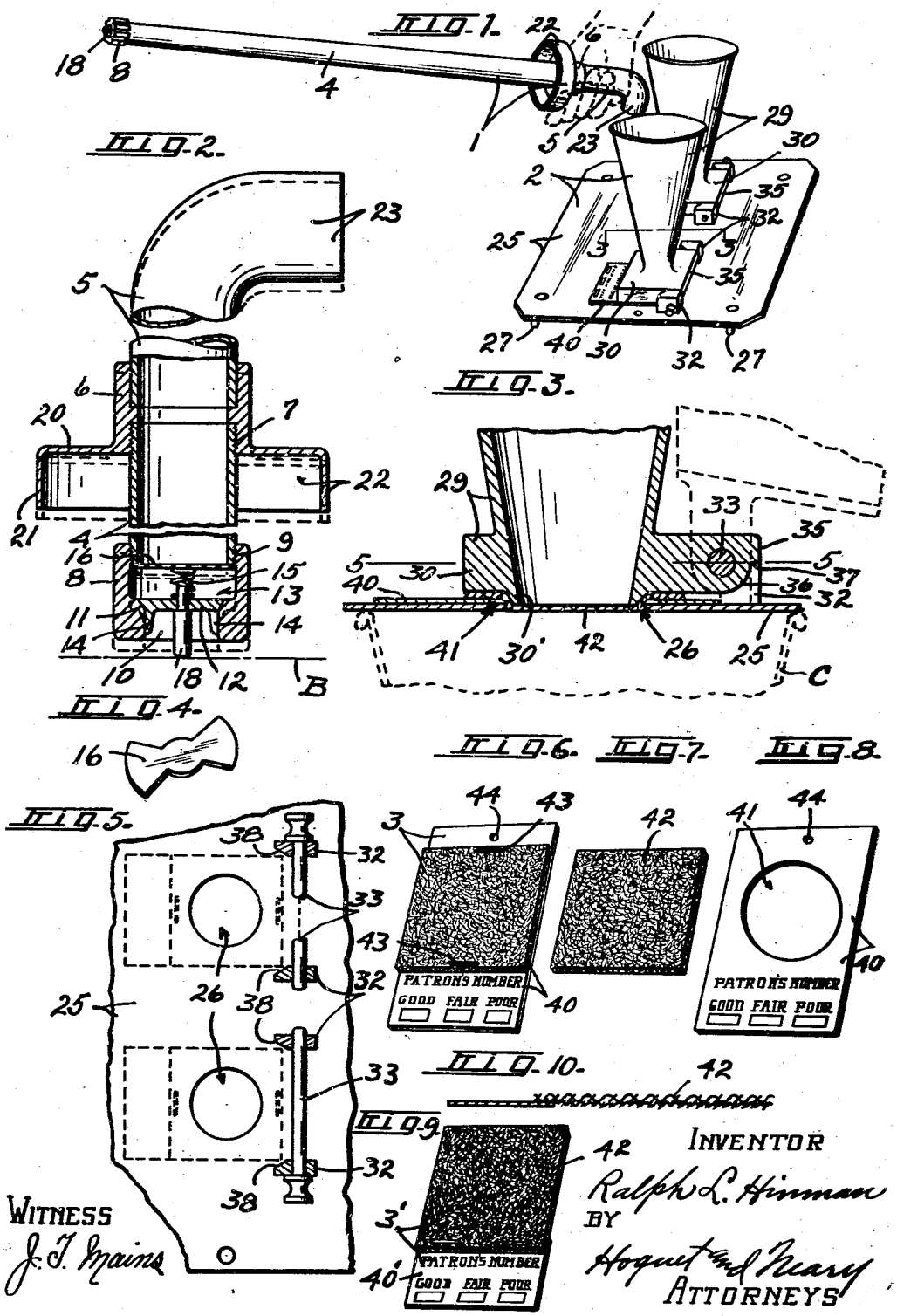

Patented Oct. 27, 1936

2,058,587

UNITED STATES PATENT OFFICE 2,058,587

MILK SEDIMENT TESTING APPARATUS

Ralph L. Hinman, Oneida, N. Y.

Application September 4, 1934, Serial No. 742,702

12 Claims. (Cl. 137—18)

This invention relates to new and useful improvements in an apparatus for testing sediment in milk whereby a predetermined quantity of milk with the sediment contained therein may be withdrawn from a milk can, vat or other receptacle and the milk thus obtained passed through a suitable filter element adapted to collect the sediment therein whereby the degree of sediment contents of the milk may be approximately ascertained.

One manner in which sediment milk tests have heretofore been made has comprised obtaining a dipper or ladle of milk by catching the milk therein as it was being poured or drawn from the receptacle and then causing the milk so obtained to pass through a suitable filter element to strain out the sediment contained in the milk. This method of testing the sediment contents of milk has not only been inaccurate and consumed a considerable amount of time, but was unsanitary and wasteful inasmuch as the milk was often spilled by running over the dipper or ladle and further, this method required making the tests after the milk had been accepted from the producer or patron instead of before the acceptance thereof.

An object of the invention is to produce an apparatus for testing the sediment contents of milk whereby the sample of milk may be obtained directly from the milk receptacle before emptying the same whereby the tests may be made either before or after the milk has been accepted from the producer or patron.

Another object of the invention is to produce an apparatus of the above-mentioned class whereby the sample of milk selected may be withdrawn from or near the bottom of the milk receptacle.

A further object of the invention is to provide an improved filter whereby the test record may be readily recorded at the time the test is made upon the filter member.

A further object is to produce an improved sediment collector wherein the filter will be securely maintained in a fluid-tight manner so as to prevent milk from escaping around the edge of the filter and at the same time to permit the filter to be quickly and easily positioned therein and removed therefrom.

Still further objects of the invention are to produce a sediment testing apparatus for milk which is simple and durable in construction and operation and that may be quickly and easily disassembled or assembled so that the various elements of the apparatus may be thoroughly cleansed and easily maintained in a clean and sanitary condition.

Other objects and advantages pertaining to the details of the structure of the apparatus and to the form and relation of parts thereof will more readily appear from the following description taken in connection with the accompanying drawing in which;

Figure 1 is a perspective view of an apparatus embodying the various features of this invention;

Figure 2 is a view of the selector tube, partly in section and partly in elevation, and having certain intermediate portions thereof broken away;

Figure 3 is a detail vertical central sectional view through one of the collector funnels and adjacent portion of the base with a filter associated therewith taken substantially in the plane of the line 3—3, Figure 1;

Figure 4 is a perspective view of a spring retainer plate for the valve in the end of the selector tube;

Figure 5 is a fragmentary horizontal sectional view taken substantially in the plane of the line 5—5, Figure 3, with the upper or funnel portion of the collector removed;

Figure 6 is a perspective view of one of the filter members;

Figure 7 is a perspective view of a filter pad;

Figure 8 is a perspective view of the filter card;

Figure 9 is a perspective view of a modified form of a filter member; and

Figure 10 is a longitudinal sectional view of the filter member illustrated in Figure 9.

The apparatus as illustrated in the drawing comprises primarily a milk sediment selector tube 1, a sediment collector device 2, and a filter member 3. The selector tube 1 comprises, in this instance, an elongated substantially straight tubular body portion 4, a tubular head portion 5 which is removably connected to one end of the body member 4 by a coupling 6. This coupling 6, as shown in Figure 2 is permanently secured by friction, electric welding or other suitable means to the head 5 to form a liquid-tight connection therebetween and is removably secured to the body member or barrel 4 by screw threads 7 so that the head 5 and body 4 may be readily disconnected from each other to enable these members to be easily and thoroughly cleansed.

The opposite end of the selector tube body 4 is provided with a valve case 8 which is preferably removably secured by screw threads as 9 or the like to said body member so as to permit said valve case to be readily removed from the tube for cleansing purposes. The lower or outer end of the valve case 8 has the interior thereof reduced in diameter as at 10 to provide a valve seat 11.

A valve 12 is mounted in the upper chamber as 13 of the valve case 8 for movement into and out of engagement with the valve seat 11. The lower outer face of the valve 12 is provided with a plurality of, in this instance, three, laterally projecting prongs 14 adapted to slidably contact with the wall of the reduced portion 10 of the valve case for guiding the valve in the longitudinal movement thereof into and out of engagement with the seat 11.

The valve 12 is yieldingly maintained in a normally closed position against the seat 11 by a spring 15 which is mounted in the chamber 13 between the inner end of the valve and a retainer plate 16 which, in this instance, is of less width than the diameter of the chamber 13 or of the interior of the body portion 4 and extends diametrically across the chamber 13 with the ends thereof engaging the adjacent end of the body 4 which prevents said plate from outward movement. The valve 12 is also provided with a stem 18 which is permanently secured in a suitable manner to the center portion of the valve 12 and extends downwardly or outwardly therefrom.

The stem 18 is of such a length that when the valve 12 is in the closed position in contact with the seat 11, the outer end of the stem will project a short distance beyond the adjacent end of the valve case 8 so that the valve 12 may be lifted from the seat 11 against the action of the spring 15 by bringing the outer end of the stem in contact with a fixed member such as the bottom of a milk receptacle.

The coupling 5 has the end thereof adjacent the valve case 8 provided with an outwardly extending annular flange 20 which, in turn, is provided at the peripheral edge thereof with an axially extending annular rim 21 which cooperates with the flange 20 to form a catch basin 22 having the open side thereof facing the valve case 8 for receiving the milk which collects on the body 4 as the contents of the tube 1 is being emptied therefrom in a manner hereinafter more fully explained.

The outer end of the head 5 is bent at substantially right angles to the remaining portion thereof to form a nozzle or a spout 23 through which the contents of the selector tube may be poured.

The hereinbefore mentioned sediment collector device 2 comprises a substantially flat rectangular base plate 25 having a pair of spaced apertures 26 extending therethrough. The base plate 25 is adapted to rest upon the top of a milk can as C, Figure 3, or other suitable milk receptacle, and in order that the base may not be readily displaced from operative relation with the receptacle C I have provided said base with a plurality of, in this instance four, pendant pins 27, two of which are illustrated in Figure 1.

These pins 27 are so arranged that they will extend downwardly adjacent the rim of the receptacle for not only engaging said rim to prevent the base from being accidentally pushed from the receptacle, but also to assist in aligning the apertures 26 with the inlet of the receptacle.

A pair of reception funnels 29 is provided, one for each aperture 26 and which are adapted to be moved into and out of registration with a respective aperture to form a liquid passageway through the collector device. The lower end of each reception funnel 29 is provided with an enlarged rectangular base portion 30 which is pivotally secured to the base plate by a suitable hinge connection so that each funnel may swing from an inoperative position in substantially a horizontal plane at one side of the respective opening 26 to an operative position in substantially a vertical plane in registration with said base plate opening.

The hinge connection for each reception funnel, in this instance, comprises a pair of pintle posts 32 secured to or made integral with the base plate 25 and positioned at the rear and equal distances at opposite sides of a respective base plate aperture 26 and a pintle 33 which extends through aligned openings provided in the rear portion of the funnel base 30 and upper ends of the posts 32. These pintles 33 are removably mounted in the posts 32 and base 30 so that the reception funnels may be readily disconnected from the base plate 25 by removing the corresponding pintle 33 to permit the funnels and base plate to be readily and thoroughly cleansed after each testing period and then be as readily secured to the base plate by the insertion of the pintles in the post and base apertures.

The lower face of each funnel base 30 is formed substantially flat and when the funnel is in the operative position in registration with a base plate aperture 26 is adapted to be positioned in slightly spaced parallel relation to the adjacent face of the base plate 26 for the reception of a filter member 3 therebetween. The lower face of each funnel base is provided with a pendant annular flange 30' surrounding the outlet opening of the funnel passage and which is adapted to extend into the respective base plate aperture 26 for the purpose of securing the filter member 3 in operative position over the corresponding aperture 26 in the manner hereinafter more fully explained.

The rear side 35 of each funnel base 30, in this instance, extends rearwardly or outwardly from the axis of the pintle 33 a distance substantially equal to the distance between said axis and the adjacent portion of the base plate 25 so that when the funnel is in the inoperative horizontal position, said portion 35 of the base 30 will engage the base plate and maintain the funnel in said inoperative position against further downwardly pivotal movement.

The rear edge of the lower face of each funnel base 30 terminates in a curved portion 36 formed concentric with the pintle 33 and which, in turn, terminates at its junction with the side portion 35 in a shoulder 37 which extends radially outwardly from the pintle 33 in parallel relation with the lower face of the base 30 so that when the funnel is in the inoperative horizontal position, the respective shoulder 37 will be coincident with the vertical plane passing through the axis of the pintle 33 to form a limiting stop adapted to be engaged by the inner end of the filter element for aligning the filter pad longitudinally with the corresponding base aperture 26 in a manner which will hereinafter be more apparent.

In order to further assist the operator in aligning the filter element with the base openings 26 and also with the interior of the funnels 29, each of the pintle posts 32 have the inner forward edge thereof beveled as at 38 adapted to engage the sides of the filter members as they are moved rearwardly across the apertures 26 into engagement with the shoulder 37 of each funnel for effecting the lateral adjustment of the filter element.

The hereinbefore mentioned filter member 3, as illustrated in Figures 6, 7 and 8, comprises a base card 40 composed preferably of paper, thin cardboard or the like. The base 40 is, in this instance, substantially rectangular in plan view and is of greater width than the diameter of the base plate apertures 26 and substantially equal to that of the distance between corresponding pairs of pintle posts 32.

The base 40 is provided with a hole 41 substantially equal to or greater in diameter than the base plate apertures 26 and is arranged at a distance from one end of the card 40 substantially equal to the distance a base plate aperture 26 is from the vertical plane passing through the axis of a corresponding pintle 33 so that when the forward end of the card is abutted against the shoulder 37 of the funnel base 30, the card hole 41 will align with the corresponding base plate aperture 26.

A filter pad 42, preferably composed of porous fibrous material such as cotton, reinforced with gauze or similar material, is positioned upon one face of the card 40 to extend across the hole 41 and is secured to the card at opposite sides of the hole by staples 43 or other suitable means. The card 40 and pad 42 are preferably so related that the card extends outwardly at opposite ends beyond the pad so that one end may be provided with an aperture 44 for the reception of a peg or other fastening means whereby the filter element may be removably secured in a convenient location after the test has been made, while the other end of the card may be utilized as a record space upon which data pertaining to the test may be printed or otherwise affixed.

In Figures 9 and 10 are shown a modified form of a filter element as 3' wherein the filter pad 42 is secured at one side only to a tab as 40' so that the tab and pad extend outwardly in opposite directions from each other and only a very small portion thereof is arranged in overlapping relation. This tab 40' is adapted, like the end of the card 40 opposite the aperture 44, to be used as a record member for the reception of data pertaining to the sediment test.

In operation the collector device 2 is first prepared for making the sediment test by the insertion of a filter element such as indicated at 3 or 3' between the funnel 29 and base plate 25 with the filter pad 42 thereof extending across the corresponding base plate aperture 26.

As heretofore stated, the filter element is inserted while the funnel is in the inoperative or horizontal position after which the funnel is swung about the pintle rod 33 as an axis to the vertical or operative position. As the funnel approaches the vertical position, the lower flange portion 30' will engage the adjacent portion of the filter pad 42 and press said pad downwardly through the filter card opening 41 and into the base plate opening 26 or until the lower flat surface portion of the funnel base 30 engages the adjacent or marginal portion of the filter pad.

It is thus seen that the filter element is securely maintained by merely swinging the funnel member to the operative position in operative relation with the fluid passage extending through the collector device. Furthermore, it will be observed that inasmuch as that portion of the filter pad which extends across the outlet opening of the funnel member is positioned within or below the base plate aperture 26 that liquid, as milk, passing through the collector device will be prevented from leaking outwardly around the marginal portion of the filter base so that all of the liquid will be deposited in the receptacle as C.

After the collector device has thus been made ready, the selector tube may then be loaded with a quantity of liquid, as milk, by the insertion of the selector tube into a receptacle as a milk can. As the tube enters the milk, it is obvious that no liquid can enter the body or barrel 4 of the tube due to the fact that the valve 12 is normally in the closed position until such time as the valve is opened. The opening of the valve 12 is effected by engaging the valve stem 18 with the bottom as B of the milk receptacle and then exerting a downward pressure on the selector tube sufficiently to open the valve against the action of the spring. It will, therefore, be seen that the lower or inlet end of the tube is adjacent the bottom of the receptacle when the valve is open so that liquid as milk and the sediment contained therein may readily flow by gravity upwardly past the valve 12 into the inner chamber of the barrel 4.

The barrel 4 of the selector tube is so constructed relative to the ordinary milk can that when the can is full of milk the barrel will receive and contain a predetermined quantity of the milk, for instance one pint, so that a uniform test may be made of each full can of milk. After the barrel 4 of the selector tube has received the sample of milk, the valve 12 may be permitted to close by releasing the pressure on the tube after which the tube and the sample of milk contained therein may be removed from the milk receptacle and the contents of the tube poured outwardly through the spout 23 into one of the funnels 29 whereupon the milk will flow through the filter element secured in the selector device and the sediment contained in the milk will be seperated from the milk and collected upon the filter pad 42.

After the sample of milk has been poured from the selector tube and while it is passing through the filter pad the desired data such as the patron's number or other identification mark may be registered on the recording portion of the filter card.

After all of the milk has passed through the filter, the card may be quickly and easily removed from between the funnel and the base and placed upon a peg or other suitable retaining means where the pad is permitted to dry.

Inasmuch as it is necessary to tilt the valve end of the selector tube upwardly during the pouring of the milk from the tube, it is obvious that milk collected upon the exterior of the barrel of the tube will flow downwardly toward the nozzle 23 and as this occurs the milk will be caught in the catch basin 22 and prevented from flowing onto the head 5 and dripping therefrom onto the collector 2.

It will now be readily apparent that I have provided a very simply constructed and operated sediment testing device the parts of which may be readily assembled and disassembled so as to permit the same to be maintained in a clean, sanitary condition, and although I have shown and particularly described the preferred embodiment of my invention, I do not wish to be limited to the exact construction shown, as various changes may be made in the size, form and relation of the parts thereof without departing from the spirit of this invention as set forth in the appended claims.

I claim:

1. In an apparatus for testing sediment in milk, a sediment collector means comprising a base element having an aperture therethrough, a funnel member mounted on said base in cooperative relation with said aperture to form a fluid passageway, and a filter member mounted between the funnel and base to extend across said passageway.

2. A device as in claim 1 having means for removably securing the funnel to the base.

3. A device as in claim 1 having hinged means for securing the funnel to the base to permit the funnel to be swung into and out of cooperative relation with said aperture.

4. In an apparatus for testing sediment in milk, a sediment collector means comprising a base element having an aperture therethrough, a filter member mounted on the base and including a record card having a hole therethrough and a filter pad mounted on said card to extend across said hole, and liquid conveying means mounted on said base for movement into cooperative relation with the base aperture to form a liquid passageway, said latter means having means engaging said filter member for maintaining the filter pad across said passageway.

5. A device as in claim 4 wherein one of said elements is provided with guide means adapted to be engaged by the filter member during the placement thereof in the sediment collector for automatically aligning the hole in the card with the aperture in said base.

6. In an apparatus for testing sediment in milk, a sediment collector means comprising a base element having an aperture therethrough, a filter member including a record card having a hole therethrough, and a filter pad secured to said card to extend across said hole, a funnel element pivotally connected to said base to swing into and out of cooperative relation with said base aperture, one of said elements having stop means adapted when the funnel is in the inoperative position to align the hole in the filter card with said base aperture during the insertion of the filter, said funnel element having means engaging the filter pad to force it downwardly into said hole for releasably securing the filter in the operative position.

7. In an apparatus for testing sediment in milk, a sediment collector comprising a base member having a plurality of spaced apertures therethrough, a plurality of funnel members one associated with each of said apertures, each of said funnel members being operatively connected with the base for movement into and out of registration with a respective aperture independently of the remaining funnel members, a filter element, and cooperative means associated with each funnel and the base for maintaining a filter element therebetween.

8. In an apparatus of the class described, a filter comprising a substantially rectangular card having an aperture therethrough, and a filter pad secured to one side of the card to extend across said aperture, said card being extended outwardly beyond the filter pad at one side thereof to form a record space.

9. In an apparatus of the class described, a filter comprising a filter pad and a card secured to said pad to extend outwardly beyond one side thereof to form a record space.

10. A sediment collector for milk comprising a sectional selector tube having a liquid passageway of substantially uniform cross sectional area extending longitudinally therethrough, said tube including a relatively long body portion, a relatively short spout portion and a catch basin portion, said spout portion and catch basin portion being removably connected with the upper end of the body portion, and an intake valve removably connected with the lower end of the body portion for normally maintaining the lower end of said passage-way closed, said valve having means adapted to engage the bottom of a milk receptacle whereby the valve may be opened by downward movement of the tube to permit milk and sediment to flow by gravity from the lower portion of the receptacle into said passage-way, the upper end of the passage-way being fully open whereby the contents of the tube may be readily discharged.

11. A sediment collector for milk comprising a selector tube having a liquid passage-way of substantially uniform cross-sectional area extending longitudinally therethrough, an intake valve connected with the tube for normally maintaining the lower end of the passage-way closed, said valve having extension means adapted for engagement with the bottom of a milk receptacle for opening the valve upon continued downward movement of the tube whereby milk and sediment will flow by gravity into said passage-way, the uper end of said passage-way being fully open whereby the contents of the tube may be readily discharged when the intake valve is closed, and a catch basin connected with the upper end of the tube below the open end of the passage-way for the purpose set forth.

12. A sediment collector for milk comprising a selector tube having a liquid passage-way extending longitudinally therethrough, a self-closing intake valve connected with one end of the tube for normally maintaining the lower end of the passage-way closed, means adapted to be manually controlled for opening said valve whereby milk and sediment will flow into said passage-way, the upper end of said passage-way being open to form an outlet through which the milk contents of the tube may be readily discharged when the intake valve is closed, and a catch basin connected with the tube adjacent the upper end of the passage-way.

RALPH L. HINMAN.

CERTIFICATE OF CORRECTION.

Patent No. 2,058,587.  October 27, 1936.

RALPH L. HINMAN.

It is hereby certified that error appears in the printed specification of the above numbered patent requiring correction as follows: Pages 3 and 4, strike out all of claims 1, 2, 3, 4, 5, 6, 7, 8 and 9 and for the claim numbers "10", "11" and "12" read 1, 2 and 3 respectively; and that the said Letters Patent should be read with these corrections therein that the same may conform to the record of the case in the Patent Office.

Signed and sealed this 16th day of February, A. D. 1937.

Seal)

Henry Van Arsdale
Acting Commissioner of Patents.